United States Patent [19]

Kashihara et al.

[11] Patent Number: 4,824,430
[45] Date of Patent: Apr. 25, 1989

[54] HIGH-SPEED CENTRIFUGAL EXTRACTOR HAVING SPIRAL LIQUID PATH

[75] Inventors: Hidechiyo Kashihara, Mito; Shin-ichi Nemoto; Kazuhiro Ueno, both of Ibaraki, all of Japan

[73] Assignee: Doryokuro Kakunenryo Kaihatsu Jigyodan, Tokyo, Japan

[21] Appl. No.: 62,119

[22] Filed: Jun. 15, 1987

[30] Foreign Application Priority Data

Jun. 19, 1986 [JP] Japan ................................ 61-143531

[51] Int. Cl.$^4$ ............................................... B04B 5/06
[52] U.S. Cl. ..................................................... 494/22
[58] Field of Search ....................... 494/22, 43, 56–58, 494/60, 66; 210/360.1, 781

[56] References Cited

U.S. PATENT DOCUMENTS 3,219,264 11/1965 Cox ..................................... 494/66 X

Primary Examiner—Timothy F. Simone
Attorney, Agent, or Firm—Wenderoth, Lind & Ponack

[57] ABSTRACT

In a high-speed centrifugal extractor of the type wherein an inlet for a mixture of heavy liquid and light liquid is disposed at the bottom of a cylindrical rotor rotating at a high speed, a heavy liquid outlet and a light liquid outlet are disposed at the upper part of the rotor and a weir for facilitating selective extraction of the heavy liquid and a weir for facilitating selective extraction of the light liquid are disposed at the upper part of the rotor in order to guide the heavy liquid phase and the light liquid phase separated inside the rotor by centrifugal force to the heavy and light liquid outlets, respectively, an improvement resides in a spiral liquid path formed inside the cylindrical rotor and extends from the mixed liquid inlet to the selection weirs so that the mixture of the heavy and light liquids introduced from the mixed liquid inlet rises along the spiral liquid path while rotating therein.

1 Claim, 3 Drawing Sheets

HIGH-SPEED CENTRIFUGAL EXTRACTOR HAVING SPIRAL LIQUID PATH

BACKGROUND OF THE INVENTION

The present invention relates to a high-speed centrifugal extractor capable of rapid liquid-liquid extraction by generating centrifugal force.

The high-speed centrifugal extractor can be used particularly for separating uranium and plutonium contained in spent nuclear fuel of nuclear fission products when reprocessing the spent nuclear fuel by a solvent extraction method (such as a Purex process), but is not limited to this application and can be applied widely to liquid-liquid extraction of any mixture comprising a heavy liquid and a light liquid.

A reprocessing method for spent nuclear fuel by employing the Purex process involves the steps of bringing a nitric acid solution (heavy liquid) containing uranium, plutonium and nuclear fission products into counter current flow contact with a tributyl phosphate (hereinafter called "TBP") diluted with hydrocarbon solution (light liquid) as an extraction solvent of uranium and plutonium in order to extract uranium and plutonium into the TBP from the nitric acid solution, then bringing once again this TBP into counter current flow contact with a new nitric acid solution in order to remove and wash the nuclear fission products that have been extracted in slight amounts into the TBP, and further bringing this washed TBP into counter current flow contact with a dilute nitric acid solution to accomplish a reverse extraction of uranium and plutonium in the TBP into the dilute nitric acid solution.

Extractors such as a mixer settler, a pulse column, and the like, have been generally used for facilitating the extraction, washing and reverse extraction processes described above. In the mixer settler, however, a sufficient residence time must be secured because natural gravitational force is utilized to separate both liquids inside the extractor due to the difference of specific gravity of the liquids, and for this reason TBP as the extraction agent is likely to be damaged by radioactive rays. In the pulse column, on the other hand, it is known in the art that the dispersion state deteriorates due to wettability of the perforated plate fitted inside the column. These are the technical problems to be solved in order to obtain a high decontamination factor and a stable operating condition. In order to increase the processing capacity, a floor area must be increased in the mixer settler while the diameter and height of the column must be increased in the pulse column. This means that the overall size of the extractors must be increased.

A high-speed centrifugal extractor has recently been developed as an extractor that solves the problems of the conventional extractors described above. The high-speed centrifugal extractor forcibly separates a mixture of the heavy liquid and light liquid into the heavy liquid and the light liquid by centrifugal force, and its typical construction is shown in FIG. 4 of the accompanying drawings. The high-speed centrifugal extractor fundamentally comprises a casing 1 and a cylindrical rotor 2 that is rotated at a high speed by a rotary shaft 3 inside the casing. The heavy liquid (such as a nitric acid solution) and a light liquid (such as TBP as an extraction agent) are supplied into a mixing chamber 6 at a lower part of the casing 1 from respective supply pipes 4 and 5. After the liquids are sufficiently mixed inside the mixing chamber 6 by an impeller 7 disposed at the lower end of the rotary shaft and rotating with it, the mixture is introduced into the rotor 2 through a center opening 9 of a rotor lower end plate 8. After the mixture is further stirred between the rotor end plate 8 and a baffle plate 10, the heavy liquid having a greater specific gravity is forced outwards while the light liquid having a smaller specific gravity remains inward of the heavy liquid due to the centrifugal force generated at the inner peripheral surface $2a$ of the rotor, and the liquids rise upwards on the rotor inner peripheral surface. Weirs 11 and 12 for facilitating selective extraction are disposed at the upper part inside the rotor 2 in order to separate the heavy liquid and the light liquid and to introduce them to respective outlets 13 and 14. The weir 11 for facilitating selective extraction of the heavy liquid has a heavy liquid draw port $11a$ that is open outwardly of the interface K between the outer heavy liquid phase and the inner light liquid phase, that is, on the side of the heavy liquid phase, and the heavy liquid passing through this draw port $11a$ flows over a plurality of weir plates $11b$, $11c$, $11d$ and is introduced into the heavy liquid outlet 13, and is discharged therefrom to a heavy liquid discharge port 16 through a heavy liquid collection chamber 15 (as represented by the solid line arrow in the drawing). On the other hand, the light liquid selection weir 12 has a light liquid draw port $12a$ that is open inwardly of the interface K between the heavy liquid phase and the light liquid phase, that is, on the side of the light liquid phase, and the light liquid flowing through this draw port $12a$ is introduced into a light liquid outlet 14, and is discharged therefrom to a light liquid discharge port 18 through a light liquid collection chamber 17 (as represented by dotted line arrow in the drawing).

Since the high-speed centrifugal extractor forcibly separates the heavy liquid and the light liquid by centrifugal force as described above, it provides the following advantages.

(1) Since mixing is performed at a high-speed, the extraction efficiency is high.
(2) Since the contact time is extremely short, damage of the extraction agent by radioactive rays is minimal.
(3) Since the quantity of the liquid residing inside the extractor is small, the hold up quantity of nuclear substances and radioactive substances is small.
(4) The size of the extractor required in order to secure the same processing capacity as that of the conventional pulse column or mixer settler is extremely small.
(5) The time required before the equilibrium state is reached is short so that the time required from the start to the finish of processing is extremely short and also the quantity of resulting waste liquor is extremely small.

In the centrifugal extractor of the type described above, sufficient centrifugal force will not act upon the mixed liquid introduced into the cylinder of the rotor 2 unless the mixed liquid rotates at a high speed with the revolution of the rotor. Therefore, in the conventional centrifugal extractor, a plurality of partitions 19 are disposed inside and in the longitudinal direction of the rotor and extend radially from the rotary shaft 3 to the rotor inner peripheral surface $2a$, to divide the rotor cylinder into a plurality of chambers as shown in FIG. 5 and thus prevent the occurrence of slip between the liquid and the rotor inner peripheral surface 2a. (In FIG. 4, the partitions 19 are not shown.)

However, a plurality of partitions 19 must be firmly fixed between the rotary shaft 3 and the rotor inner peripheral surface 2a by welding or the like. Accordingly, disassembly and inspection inside the rotor cannot be made easily. Since the rotor 2 rotates at a high speed, the partitions 19 must be fitted in a well balanced condition and the production and assembly of the partitions 19 with an ordinary machining technique is rather difficult.

If the mixture of the heavy liquid and the light liquid introduced into the rotor 2 contains any solid particles having a greater specific gravity than that of the heavy liquid, these solid particles will be deposited on the inner peripheral surface 2a of the rotor due to the centrifugal force inside the rotor. The solid particles thus deposited cannot be removed easily and eventually, the entire rotor must be replaced.

The mixture of the heavy liquid and the light liquid formed inside the mixing chamber 6 at the lower part of the casing 1 is introduced into the rotor 2 by the pressure of the impeller 7 through the center opening 9 of the rotor lower end plate 8 and at this time, the mixed liquid cannot be directly fed into the upper part of the rotor by the action of the baffle plate 10. If the pressure generated by the impeller 7 is high, however, the mixed liquid is fed directly into the upper portion of the rotor without being separated, and the effective separation between the heavy liquid and the light liquid due to centrifugal force will not be made.

SUMMARY OF THE INVENTION

In order to solve these problems of the conventional high-speed centrifugal speed extractor described above, it is therefore an object of the present invention to provide a high-speed centrifugal extractor having a structure which eliminates the necessity of disposing the partitions for preventing slip between the rotor inner peripheral surface and the liquid when the rotor is rotating.

Another object of the present invention is to provide a high-speed centrifugal extractor which has a simple structure and is easy to produce and assemble.

Another object of the present invention is to provide a high-speed centrifugal extractor which prevents the deposition of solid particles on a rotor inner peripheral surface even if the mixed liquid introduced into the rotor contains any solid particles.

A further object of the present invention is to provide a high-speed centrifugal extractor which prevents the direct feed of the mixture of the heavy liquid and the light liquid into the upper portion of a rotor.

According to the present invention, there is provided a high-speed centrifugal extractor of the type wherein an inlet for a mixture of heavy liquid and light liquid is disposed at the bottom of a cylindrical rotor rotating at a high speed, a heavy liquid outlet and a light liquid outlet are disposed at the upper part of the rotor and a weir for facilitating selective extraction of the heavy liquid and a weir for facilitating selective extraction of the light liquid are disposed at the upper part of the rotor in order to guide the heavy liquid phase and the light liquid phase separated inside the rotor by a centrifugal force to the heavy and light liquid outlets, respectively, characterized in that a spiral liquid path is formed inside the cylindrical rotor and extends from the liquid inlet to the selection weirs so that the mixed mixture of the heavy and light liquids introduced from the mixed liquid inlet rises along the spiral liquid path while rotating therein.

The spiral liquid path described above can be formed by a rotor rotary shaft having spiral projections threaded to a rotor cylindrical wall equipped with spiral grooves on the inner peripheral surface thereof.

The apparatus of the present invention has a similar structure to the conventional centrifugal extractor in that the inlet of the mixed liquid of the heavy liquid and the light liquid is disposed at the bottom of the cylindrical rotor rotating at a high speed, the heavy liquid outlet and the light liquid outlet are disposed at the upper portions of the rotor and the weir for facilitating selective extraction of the heavy liquid and the weir for facilitating selective extraction of the light liquid are disposed at the upper portions inside the rotor in order to introduce the outer heavy liquid phase and the inner light liquid phase to the respective outlets.

An important feature of the present invention lies in the internal structure of the cylindrical rotor. Namely, the partitions for preventing the slip between the rotor inner peripheral surface and the liquid employed in the conventional apparatus are not disposed inside nor do the same extend in the longitudinal direction of the rotor, but rather the spiral liquid path is formed inside the rotor and extends from the mixed liquid inlet at the bottom of the rotor to the upper selection weirs at the upper part of the rotor.

The mixture of the heavy liquid and the light liquid that is introduced from the mixed liquid inlet into the rotor rotating at a high speed is introduced into the spiral liquid path and rises along the rotor inner peripheral surface while rotating inside this liquid path. During such a rotating and rising process, the heavy liquid of the mixture is forced outwardly while the light liquid remains inwardly of the heavy liquid due to centrifugal force and they then flow to the upper part of the rotor. The heavy liquid phase thus separated is introduced into the heavy liquid outlet through the heavy liquid draw port of the weir, for facilitating selective extraction of the heavy liquid, that is disposed at the upper part of the rotor, in the same way as in the conventional apparatus shown in FIG. 4, while the light liquid phase is introduced into the light liquid outlet through the light liquid draw port of the weir for facilitating selective extraction of the light liquid.

As described above, the mixed liquid introduced into the rotor rises while rotating inside the spiral liquid phase 40. At this time, the rotational speed of the rotor is higher than the rotating moving speed of the liquid so that slip always occurs between the liquid and the rotor inner peripheral surface. Thus, even if any solid particles are contained in the mixed liquid, they cannot be easily deposited on the rotor inner peripheral surface.

Since no portion of the vertical liquid path extending from the lower part to the upper part of the rotor is formed inside the rotor, the mixed liquid introduced from the mixed liquid inlet at the bottom of the rotor by the pressure of the impeller will not be forced directly into the upper part of the rotor.

The above and other objects and novel features of the present invention will become more apparent from the following detailed description when taken in conjunction with the accompanying drawings.

DETAILED DESCRIPTION OF THE PREFERRED EMBODIMENTS

Figure 1:
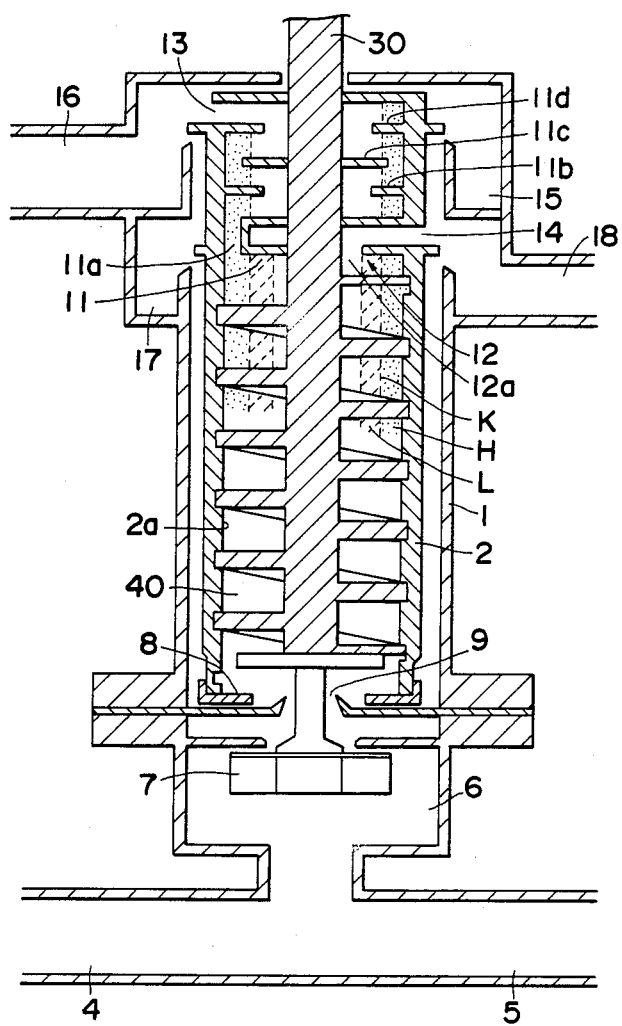
FIG. 1 is a longitudinal sectional view showing one embodiment of the present invention.

Hereinafter, the present invention will be described in further detail with reference to preferred embodiments thereof and to FIGS. 1 to 3. In these drawings, like reference numerals are used to identify like parts and elements of the conventional apparatus shown in FIG. 4.

FIG. 1 is a schematic sectional view illustrating the overall construction of the high-speed centrifugal extractor in accordance with the present invention. The extractor fundamentally comprise a casing 1 and a cylindrical rotor 2 that is disposed inside and coaxially with the casing 1 and can be rotated freely. A rotary shaft 30 rotated at a high speed by driving means (not shown) is disposed at the center of the rotor 2 so that the rotor 2 rotates with the rotary shaft 30. The rotary shaft 30 extends into a mixing chamber 6 at the lower part of the casing 1 through a center opening 9 of a rotor lower end plate 8, and an impeller 7 is fitted to the lower end of the rotary shaft 30. Weirs 11 and 12 for facilitating selective extraction of the heavy liquid and the light liquid, respectively, are disposed at the upper part inside the rotor 2. The heavy liquid weir 11 has a heavy liquid draw port 11a that is open to a heavy liquid phase H and communicates with a heavy liquid outlet 13 through a plurality of weirs 11b, 11c and 11d. On the other hand, the light liquid weir 12 has a light liquid draw port 12a open to a light liquid phase L, and communicates with a light liquid outlet 14. The bottom of the casing 1 is connected to a heavy liquid supply pipe 4 and to a light liquid supply pipe 5, and a heavy liquid discharge port 16 and a light liquid discharge port 18 are disposed at the upper part of the casing 1 and communicate with the heavy liquid and light liquid outlets 13 and 14 of the rotor through annular heavy liquid and light liquid collection chambers 15 and 17, respectively.

Figure 4:
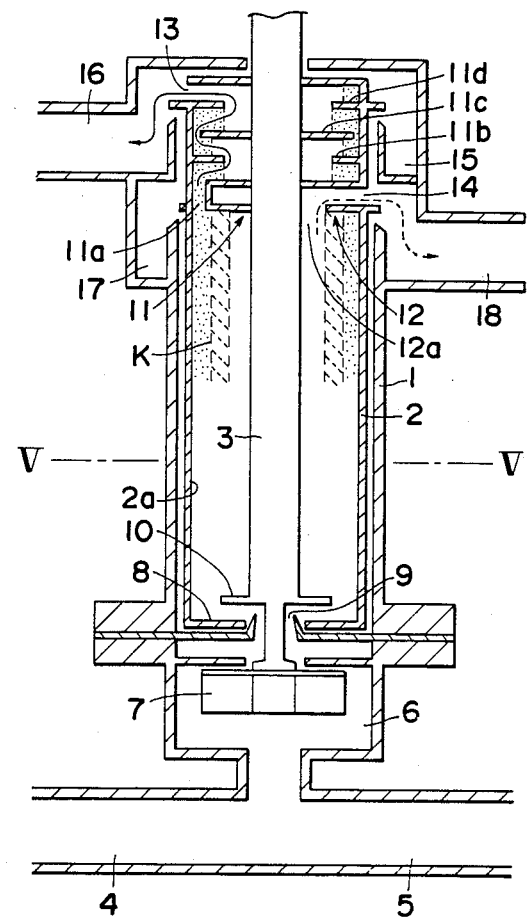
FIG. 4 is a longitudinal sectional view showing a typical example of a conventional centrifugal extractor.
Figure 5:
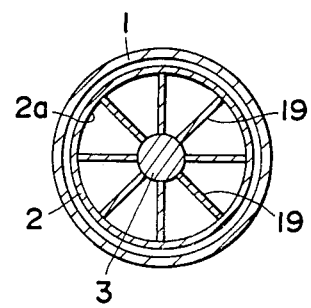
FIG. 5 is a sectional view taken along line V—V of FIG. 4.

The construction described above is substantially similar to that of the conventional apparatus shown in FIG. 4, but the present invention is different from the conventional apparatus in that the spiral liquid path is formed inside the rotor 2.

Figure 2:
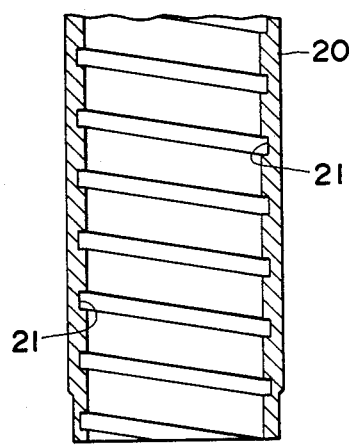
FIGS. 2 and 3 are longitudinal sectional views showing a rotor cylindrical wall and a rotary shaft that constitute the principal portion of the rotor of the high-speed centrifugal extractor in accordance with the present invention, respectively.
Figure 3:
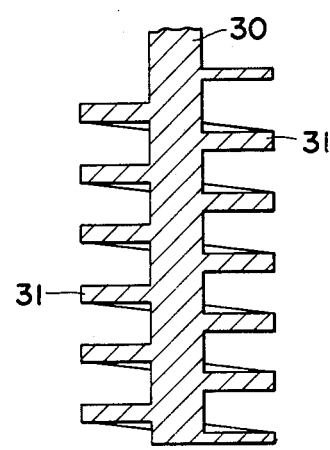

In other words, the rotor principal portion in the present invention has a rotor cylindrical wall 20 as shown in FIG. 2 and a rotary shaft 30 having spiral projections 31 as shown in FIG. 3. The rotor cylindrical wall 20 shown in FIG. 2 has spiral grooves 21 formed on its inner peripheral surface, while the rotary shaft 30 shown in FIG. 3 has the spiral projections 31 formed with the same pitch and extending in the same direction as the spiral grooves 21 on the inner peripheral surface of the cylindrical wall. When the spiral projections 31 are threadedly fitted into the spiral grooves 21, the rotary shaft 30 and the cylindrical wall 20 comprise an integral structure. Thus, the principal portion of the rotor 2 shown in FIG. 1 can be assembled in a manner in which the spiral liquid path 40 having a square sectional shape is defined by the rotor inner peripheral surface 2a forming one of its side walls inside the rotor 2. The rotor cylindrical wall 20 and rotary shaft 30 having such shapes can be produced easily by an ordinary screw-machining technique.

Next, the operation of the high-speed centrifugal extractor having the construction described above will be explained. The heavy liquid (e.g. a nitric acid solution) and the light liquid (e.g. TBP as the extraction agent) are supplied through the respective supply pipes 4 and 5 into the mixing chamber 6 of the casing 1, then mixed sufficiently there by the impeller 7 and thereafter introduced into the rotor 2 from the center opening 9 of the rotor lower end plate 8. The mixed liquid thus introduced into the rotor is immediately fed into the spiral liquid path 40, and rises along the rotor inner peripheral surface 2a while rotating inside this path. During this rising process, the mixed liquid is separated into the outer heavy liquid phase H and the inner light liquid phase L. The heavy liquid phase H separated in this manner is discharged through the heavy liquid draw port 11a of the heavy liquid weir 11, overflows through a plurality of weir plates 11b, 11c and 11d, then flows into the heavy liquid collection chamber 15 of the casing through the heavy liquid outlet 13 and is thereafter withdrawn from the heavy liquid discharge port 16. The light liquid phase L is discharged through the light liquid draw port 12a of the light liquid weir 12, flows into the light liquid collection chamber 17 of the casing through the light liquid outlet 14 and is withdrawn from the light liquid discharge port 18.

The construction of the high-speed centrifugal extractor shown in the drawings is merely for explaining a preferred embodiment of the present invention. Therefore, the present invention is not particularly limited thereto. For example, the shape of the casing 1, the mode of supply of the heavy and light liquids into the casing or rotor 2, the structure of the weirs 11, 12 for selecting the heavy and light liquids, and so forth, need not necessarily be the same as those of the embodiment shown in the drawings. And, the the characterizing feature of the present invention, wherein the spiral liquid path 40 is disposed inside the rotor, can be applied to any type of centrifugal extractor so long as it is of the type in which the mixed liquid comprising heavy and light liquids is supplied to the bottom of the cylindrical rotor that rotates at a high speed so as to be separated into heavy and light phases by centrifugal force.

As can be understood from the description given above, the present invention is drawn to a structure wherein the spiral liquid path is disposed inside the rotor, and eliminates the necessity of disposing the slip prevention partitions in the longitudinal direction of the rotor as in the conventional apparatus. As a result, the mixture of the heavy and light liquids introduced into the rotor is gradually separated into a heavy liquid phase and a light liquid phase while rotating and rising along the spiral liquid path.

Accordingly, since the liquid rises to the upper part of the rotor while slipping on the rotor inner peripheral surface, any solid particles contained in the liquid are not easily deposited on the rotor inner peripheral surface. Thus, the present invention eliminates the problem of the conventional apparatus in which the deposited solid particles cannot be removed and the entire rotor must be replaced.

Since the vertical liquid path of the conventional apparatus that extends from the lower part to the upper part is not provided inside the rotor in the present invention, the mixture of the heavy and light liquids introduced from the rotor bottom is never forced directly to the upper part of the rotor which, otherwise, would result in ineffective separation of the liquid phases by the centrifugal force.

Furthermore, the cylindrical rotor having the spiral liquid path formed therein can be assembled relatively easily by screwing the rotary shaft having the spiral projections into the rotor cylindrical wall formed with the spiral grooves on its inner peripheral surface. Therefore, the rotor of the present invention has a simpler construction and can be produced more easily than the rotor of the conventional apparatus, and disassembly and inspection of the rotor can be made more easily.

While the preferred embodiment of the present invention has thus been described using specific terms, such description is for illustrative purpose only, and it is to be understood that changes and modifications may be made without departing from the spirit or scope of the following claims.

What is claimed is:

1. In a high speed centrifugal extractor for centrifuging a mixture of heavy and light liquids into a heavy liquid phase and a light liquid phase, the centrifugal extractor having a cylindrical rotor in which the mixture is centrifuged, an inlet disposed at the bottom of the cylindrical rotor and through which the mixture is introduced into the rotor, a heavy liquid outlet and a light liquid outlet each disposed at an upper portion of the rotor, a heavy liquid weir operatively connected between the rotor and the heavy liquid outlet and through which the heavy liquid phase of the mixture centrifuged in the rotor passes to the heavy liquid outlet, and a light liquid weir operatively connected between the rotor and the light liquid outlet and through which the light liquid phase of the mixture centrifuged in the rotor passes to the light liquid outlet, wherein the improvement comprises:

said cylindrical rotor having an internal peripheral surface in which a spiral groove extends, and a rotor rotary shaft extending in and threadingly engaging said rotor, said rotary shaft having a central shaft portion and a flange extending spirally along said shaft portion, said flange having an outer peripheral edge portion extending in said spiral groove and engaging said rotor therein so as to facilitate the threaded engagement of the cylindrical rotor and the rotor rotary shaft, said shaft portion, said flange and the internal peripheral surface of said rotor collectively defining a spiral passageway within said rotor.

* * * * *